(12) United States Patent
Gogo et al.

(10) Patent No.: US 6,450,282 B1
(45) Date of Patent: Sep. 17, 2002

(54) SWINGARM SUPPORT STRUCTURE

(75) Inventors: Kazuhiko Gogo; Kenji Ootani, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,383

(22) Filed: Mar. 24, 2000

(30) Foreign Application Priority Data

Mar. 24, 1999 (JP) .......................................... 11-080531

(51) Int. Cl.[7] ............................................... B62D 61/02
(52) U.S. Cl. ...................................................... 180/219
(58) Field of Search ................................. 180/227, 219

(56) References Cited

U.S. PATENT DOCUMENTS

| | | | | |
|---|---|---|---|---|
| 4,463,824 A | * | 8/1984 | Boyesen ...................... | 180/227 |
| 4,696,364 A | * | 9/1987 | Enoki et al. ................. | 180/228 |
| 4,809,801 A | * | 3/1989 | Enoki et al. ................. | 180/228 |
| 4,913,255 A | * | 4/1990 | Takayanagi et al. ......... | 180/227 |
| 5,011,459 A | * | 4/1991 | Van De Vel ................. | 474/101 |
| 5,361,864 A | * | 11/1994 | Tanaka ........................ | 180/219 |
| 5,657,830 A | * | 8/1997 | Kawashima et al. ........ | 180/220 |
| 5,960,902 A | * | 10/1999 | Mancini et al. ............. | 180/227 |
| 6,003,628 A | * | 12/1999 | Jurrens et al. .............. | 180/227 |
| 6,024,185 A | * | 2/2000 | Okada et al. ............... | 180/227 |
| 6,189,638 B1 | * | 2/2001 | Ito et al. ..................... | 180/227 |

FOREIGN PATENT DOCUMENTS

| | | | | | |
|---|---|---|---|---|---|
| JP | | 401240393 A | * | 9/1988 | ........... B62K/25/28 |
| JP | | B275113 | | 1/1995 | |
| JP | | 2000085673 A | * | 9/1998 | ........... B62D/61/02 |

* cited by examiner

Primary Examiner—Brian L. Johnson
Assistant Examiner—Paul Royal, Jr.
(74) Attorney, Agent, or Firm—Birch, Stewart, Kolasch & Birch, LLP (57) ABSTRACT

A tip end of a pivot shaft is hollowed out and a threaded section is formed inside. A pivot support shaft is attached to left and right pivot support sections by screwing a bolt into the threaded section. Since the only parts of the pivot shaft and the bolt section that protrude from the left and right pivot support sections are the respective head sections, it is possible to make the length of protrusion from the left and right pivot support sections constant. As a result, all that protrudes from the left pivot support section arranged on the bolt side or the right pivot support section is the bolt head. Furthermore, it is possible to make the depth of the left pivot support section arranged on the bolt side or the depth of the right pivot support section shallower.

18 Claims, 6 Drawing Sheets

SWINGARM SUPPORT STRUCTURE

BACKGROUND OF THE INVENTION

1. Field of the Invention

The present invention relates to an improvement to a swingarm support structure.

2. Description of Related Art

A swingarm support section is known from Japanese Patent publication No. Hei. 7-5113, entitled "Rear Arm Mounting Structure For Motorcycle." In this technology, as shown in FIG. 1 and FIG, 2 of that publication, plate-like brackets 3, 3 are provided on the left and right of a vehicle body. A support pipe 10 of a rear arm 6 is supported on the plate-like brackets 3, 3 via a pivot shaft 8. The rear arm 6 is swingably attached to the plate-like brackets 3, 3 by screwing a nut 14 onto the pivot shaft 8. Furthermore, cover plates 4, 4 for covering a boss head 8a of the pivot shaft 8 and a tip end of the pivot shaft 8 are attached to the left and right plate-like brackets 3, 3.

However, with the above described pivot shaft 8, the length by which the tip end of the pivot shaft 8 projects from the plate-like brackets 3, 3 varies depending on the torque with which the nut 14 is screwed on. Accordingly, in order to stop a rider's legs etc. from getting caught on the tip end of the pivot shaft 8, it is necessary for there to be a margin in the depth of the cover plate 4. Furthermore, it is necessary to make the attachment sections for the pivot shift 8 wide in the width direction of the vehicle.

Also, when the pivot shaft 8 is passed through the plate-like brackets 3, 3 and the support pipe 10, there is a concern that the threads of the pivot shaft 8 will be damaged, making it impossible to screw the nut 14 onto the pivot shaft 8.

SUMMARY OF THE INVENTION

An object of the present invention is therefore to provide a swing arm support structure having a pivot shaft which does not jut out too far in the width direction of the vehicle. Furthermore, it is an object of the present invention to ensure that the threads of the pivot shaft are not damaged during assembly of the swing arm support structure.

In order to achieve the above-described object, a swingarm support structure according to a first aspect of the present invention is provided in a motorcycle having a seat between a front wheel and a rear wheel, left and right pivot support sections provided on both sides of a vehicle frame below the seat, and a swingarm for supporting the rear wheel swingably supported at the pivot section via a pivot shaft. The swingarm support structure includes a tip end of the pivot shaft hollowed out, a threaded section formed inside the pivot shaft, and a bolt screwed into the threaded section to attach the pivot shaft to the left and right pivot support sections.

As in the related art, a threaded section is formed on a tip end of a pivot shaft. Accordingly, when the left and right pivot support sections are fastened by screwing a nut onto the threaded section, the length to which the tip end of the pivot shaft protrudes varies depending on the torque with which the nut is screwed on as described in detail in FIG. 5 of the present invention. In the first aspect of the present invention, the tip end of the pivot shaft is hollowed out, and a threaded section is formed inside the pivot shaft. Accordingly, by screwing a bolt into the threaded section, the pivot shaft is attached to the left and right pivot support sections.

In view of this construction, the only parts of the pivot shaft and bolt which protrude from the left and right pivot support sections are the heads of the bolts. Therefore, the length to which the pivot shaft and bolts project from the left and right support sections becomes constant. As a result, the only thing protruding from the left pivot support section located on the bolt side, or the right pivot support section, is the bolt head. Accordingly, compared to the related art, the length to which the pivot shaft projects is small.

The tip end of the pivot shaft is hollowed out and threads are formed inside the pivot shaft. Furthermore, when the pivot shaft is inserted into the left and right support sections, the section into which the bolt is to be screwed is not damaged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIGS. 5(*a*) and 5(*b*) are drawings for describing the operation of the swingarm support structure of the present invention. FIG. 5(*a*) shows a comparative example and FIG. 5(*b*) shows present invention.

DETAILED DESCRIPTION OF THE PREFERRED EMBODIMENTS

Embodiments of the present invention will now be described with reference to the accompanying drawings. The drawings should be viewed in the direction of the reference numerals.

Figure 1:
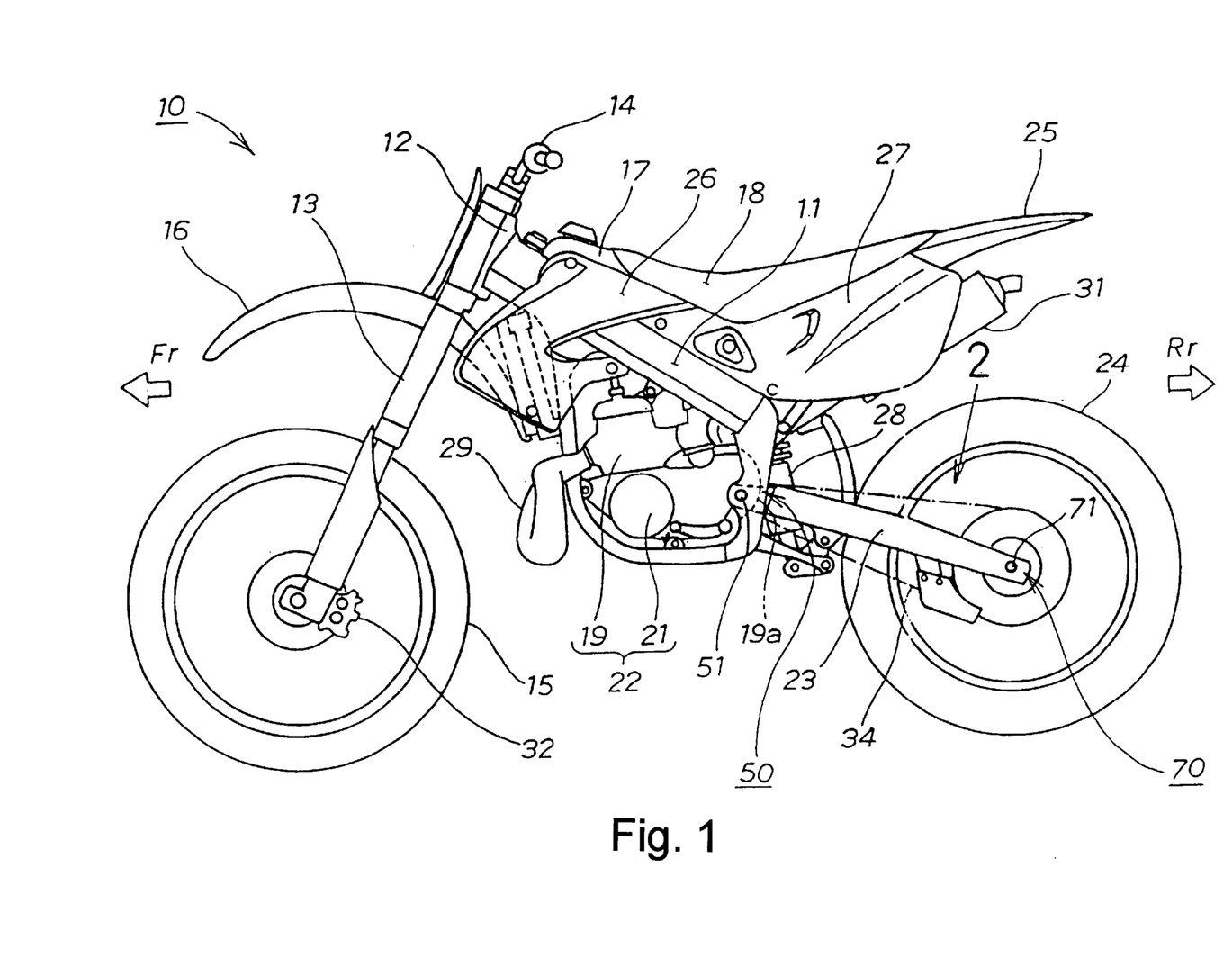
FIG. 1 is a side elevation of a motorcycle to which a swingarm support structure of the present invention is mounted.

FIG. 1 is a side elevation of a motorcycle to which a swingarm support structure of the present invention is mounted. A motorcycle 10, which is an off-road style bike in this example, comprises a vehicle frame 11, a head pipe 12 provided at a front section of the vehicle frame 11, front forks 13, 13 (the inner fork 13 is not shown) attached to the head pipe 12 so as to be capable of rotation, a handle bar 14 attached to upper sections of the front forks 13, 13, a front wheel 1 5 attached to lower sections of the front forks 13, 13 so as to be capable of rotation, a front fender 16 covering the front wheel 15, a fuel tank 17 attached to the vehicle frame behind the head pipe 12, a seat 18 provided behind the fuel tank 17, a power unit 22 comprising an engine 19 arranged below the seat 18 and the fuel tank 17 and a transmission 21, a swingarm 23 swingably attached to the vehicle frame 11 behind the power unit 22, a rear wheel 24 attached to the swingarm 23 so as to be capable of rotation and driven by the power unit 22, and a rear fender 25 provided above the rear wheel 24.

Reference numeral 19a represents a crankcase of the engine 19, reference numeral 26 represents a radiator shroud, reference numeral 28 represents a rear suspension, reference numeral 29 represents an exhaust pipe, reference numeral 31 represents a silencer, reference numeral 32 represents a caliper, reference numeral 34 represents a drive chain, reference numeral 50 represents a swingarm support structure for supporting the swingarm 23 at the vehicle frame 11 side, and reference numeral 70 represents a rear wheel support structure as a rear wheel support device of a motorcycle for supporting the rear wheel 24 on the swingarm 23.

Figure 2:
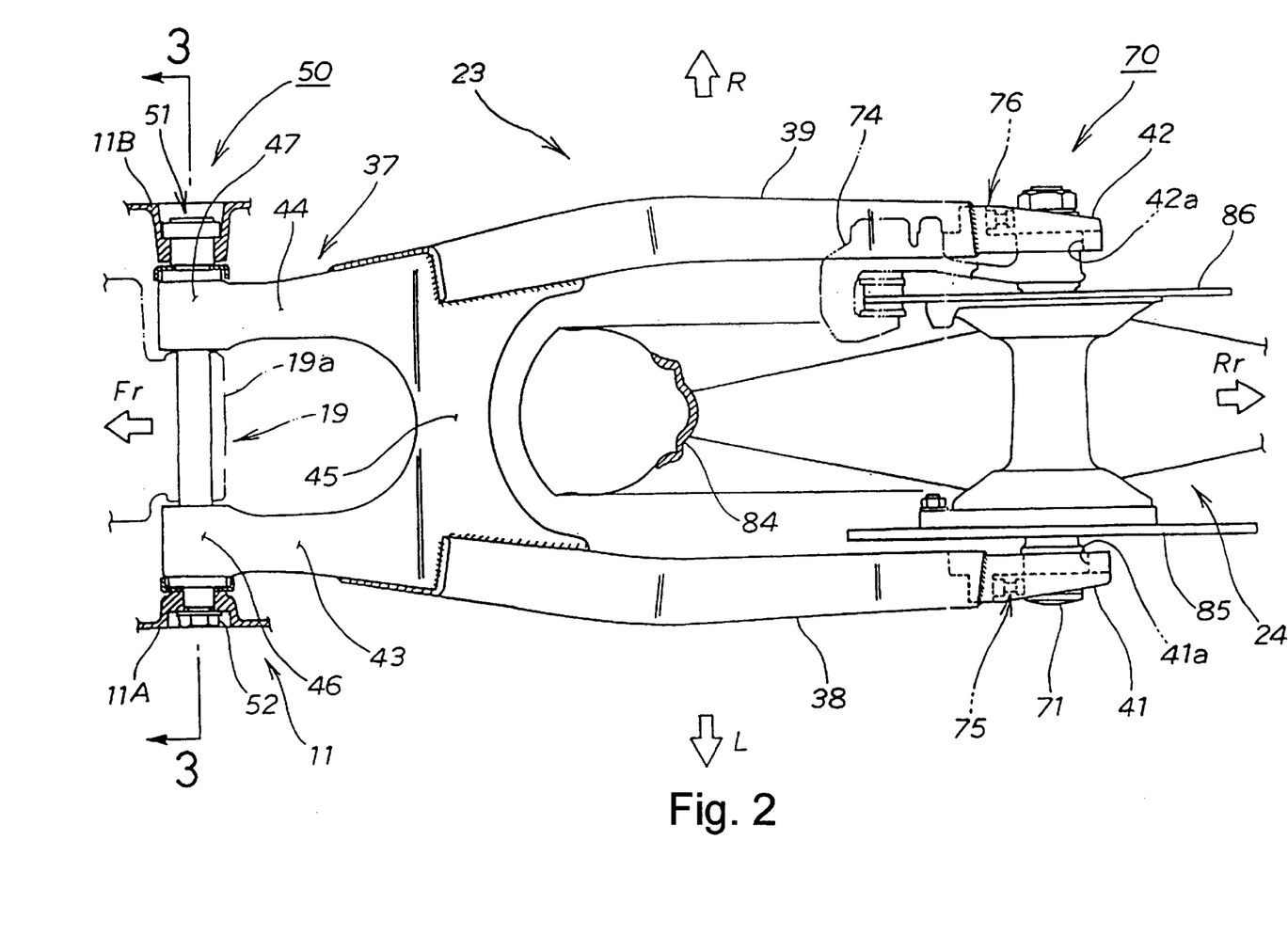
FIG. 2 is a perspective view of FIG. 1.

FIG. 2 is a perspective view of FIG. 1, and shows an attachment structure for swingarm 23 rotation. The swingarm 23 is made by attaching left and right fork pipes 38 and 39 to a substantially H-shaped arm base section 37, and forming respective left and right axle attachment sections 41 and 42 in the left and right fork pipes 38 and 39. The arm base section 37 is formed by fastening left and right arms 43 and 44 with a connecting arm 45, and forming left and right engagement sections 46 and 47 for engaging with respective vehicle frame 11 side left and right pivot support sections 11A and 11B in the front ends of the left and right arms 43 and 44.

The left axle attachment section 41 has an elongated hole 41a through which the axle shaft 71 is inserted, and has a left slide adjuster mechanism 75 for allowing sliding of the axle shaft 71 attached thereto. The right axle attachment section 42 has substantially the same structure as the left axle attachment section 41, with reference 42a being an elongated hole and reference numeral 76 being a right slide adjuster mechanism. The left and right slide adjuster mechanisms will be described in detail with reference to FIG. 4.

Figure 3:
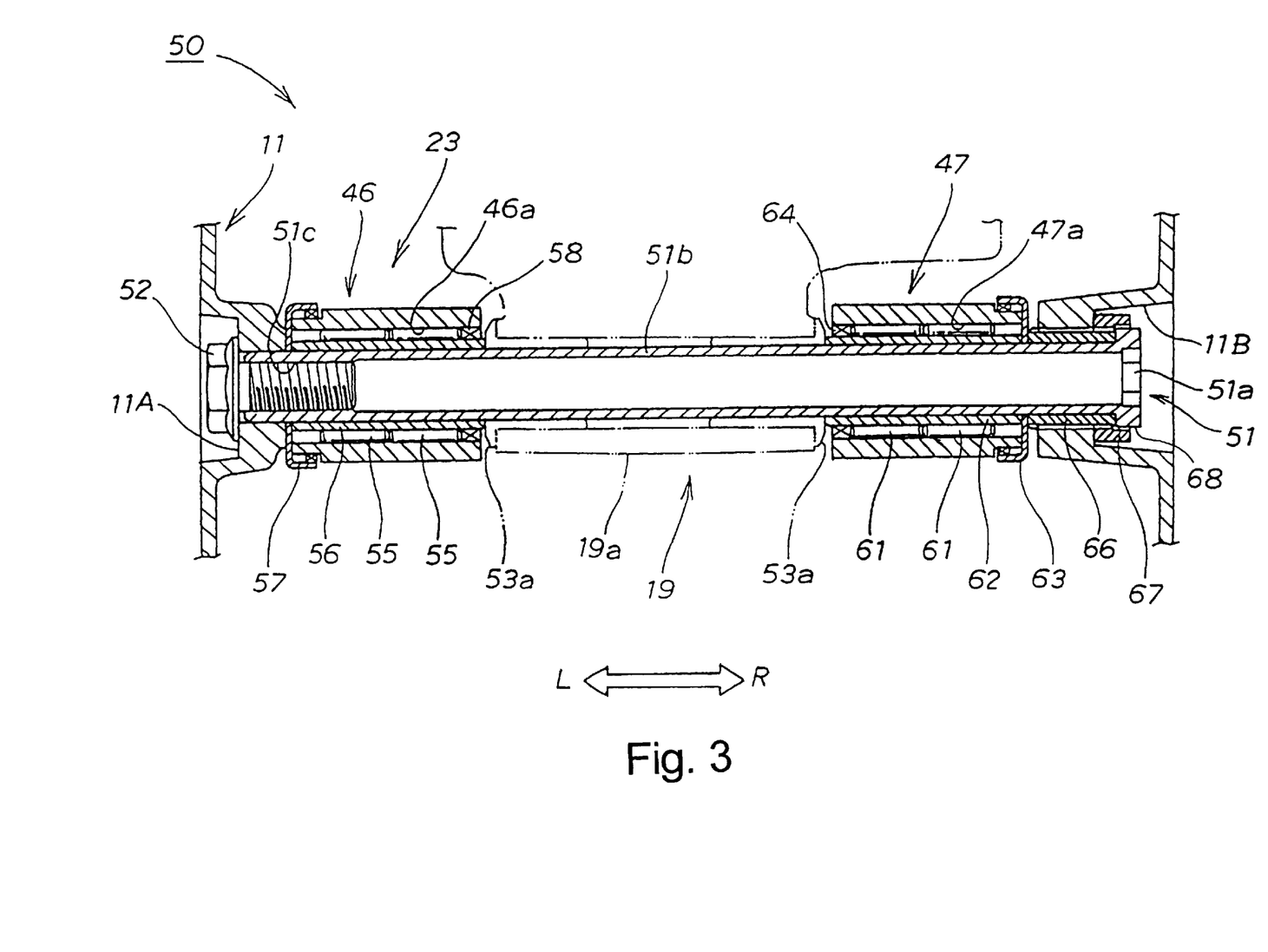
FIG. 3 is a cross sectional view along line 3—3 in FIG. 2.

FIG. 3 is a cross sectional drawing along line 3—3 in FIG. 2, showing a side cross section of the swing arm support structure. The swingarm support structure 50 has a left engagement section 46 of the swingarm 23, a crankcase 19a of the engine 19 and a right engagement section 47 of the swingarm 23 arranged in that order between left and right pivot support sections 11A and 11B of the vehicle frame 11. The pivot shaft 51 is then passed through and fastened with a bolt 52. Reference numerals 53a, 53a are collars of the crankcase 19a.

The left engagement section 46 has a pivot shaft 51 engaged in an engagement hole 46a via bearings 55, 55 and a collar 56. The left engagement section 46 is also provided with a cupped dust seal 57 on an outer side and a dust seal 58 on an inner side.

The right engagement section 47 is symmetrical to the left engagement section 46. That is, reference numeral 47a is an engagement hole, reference numerals 61, 61 are bearings, reference numeral 62 is a collar, reference numeral 63 is a cupped dust seal, and reference numeral 64 is a dust seal.

The pivot shaft 51 is formed as a shaft section 51b continuing on from a head section 51a. The shaft section 51b is hollow and a threaded section is formed in the tip end of the shaft section 51b. In order to adjust for variations in the overall dimension of the left engagement section 46, the crankcase 19a of the engine 19 and the right engagement section 47, a gap adjusting screw 66 is adjustably screwed into the left pivot support section 11B, and a locknut 67 for fixing the gap adjustment screw is provided. Further, in the left pivot support section 11B, the pivot shaft 51 has an enlarged head section 68 formed thereon at the opposite end of the tip end of the shaft section, whereby the enlarged head section 68 cooperates with the left pivot support section 11B via the gap adjusting screw 66.

Figure 4:
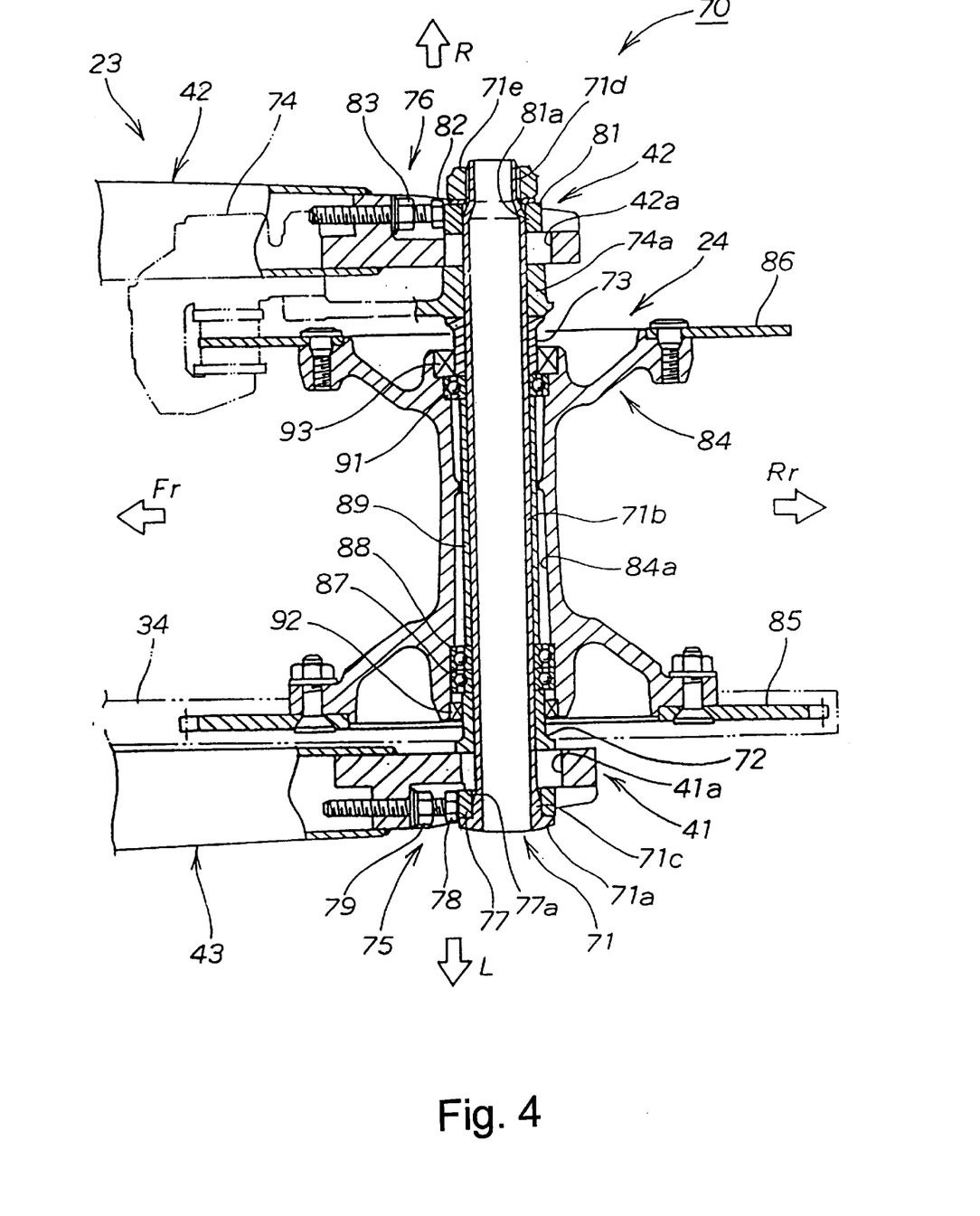
FIG. 4 is a horizontal cross sectional view of a rear wheel support structure suspended from a swingarm supported by the swingarm support structure of the present invention.

FIG. 4 is a plan cross sectional drawing of a rear wheel support structure suspended from the swingarm supported by the swing arm support structure of the present invention. The rear wheel support structure 70 has a rear wheel 24 suspended between left and right axle attachment sections 41 and 42 of the swingarm 23, via an axle shaft 71. Reference numeral 72 is a left wheel collar, reference numeral 73 is a right wheel collar, reference numeral 74 is a brake caliper and reference numeral 74a is a caliper bracket.

The axle shaft 71 has a head section 71a arranged at a drive chain 34 side, and a hollow shaft section 71b. The thickness of a base section 71c continuous to the head section 71a is made thicker than the shaft section 71b, and a threaded section 71d is formed in the tip end. The axle shaft 71 is slidably supported in respective elongated holes 41a and 42a of the left and right axle attachment sections 41 and 42 by left and right slide adjuster mechanisms 75 and 76. Reference numeral 71e is a nut screwed into the threaded section 71d.

The left slide adjuster mechanism 75 has a left adjust collar 77 through which the axle shaft 71 passes, and is provided with a movement screw 78 for moving the left adjust collar 77. A locknut 79 is attached to the movement screw 78. The locknut 79 is tightened up and the movement of the axle shaft 71 in the longitudinal direction and tension of the drive chain 34 is adjusted by rotating the movement screw 78. Reference numeral 77a represents an inner surface of the adjust collar 77.

The right slide adjuster mechanism 76 has a substantially identical structure to that of the left slide adjuster mechanism 75, with reference numeral 81 being a right adjust collar, reference numeral 81a being an inner surface of the right adjust collar, reference numeral 82 being a movement screw and reference numeral 83 being a locknut. However, the inner surface 77a of the left adjust collar 77 has a larger diameter than the inner surface 81a of the right adjust collar 81.

The base section 71c of the axle shaft 71 comes into contact with only the inner surface 77a of the left adjust collar 77. For example, if the thickness of the base section 71c and the thickness of the shaft section 71b is the same for a replacement axle shaft, in the event that the axle shaft of the present embodiment is changed it is only necessary to change the inner diameter of the adjust collar. This enables the same components to be used for different products.

The wheel hub 84 of the rear wheel 24 has a sprocket 85 attached to the left side and a brake disc 86 attached to the right side. Furthermore, axle hole 84a is provided in the center of the wheel hub 84. A bearing 87, a bearing 88, a collar 89 and a bearing 91 are interposed in this order from the left between the axle hole 84a and the axle shaft 71 to rotatably attach the wheel hub 84 to the axle shaft 71. Reference numeral 92 is a left dust seal and reference number 93 is a right dust seal.

Figure 5A:
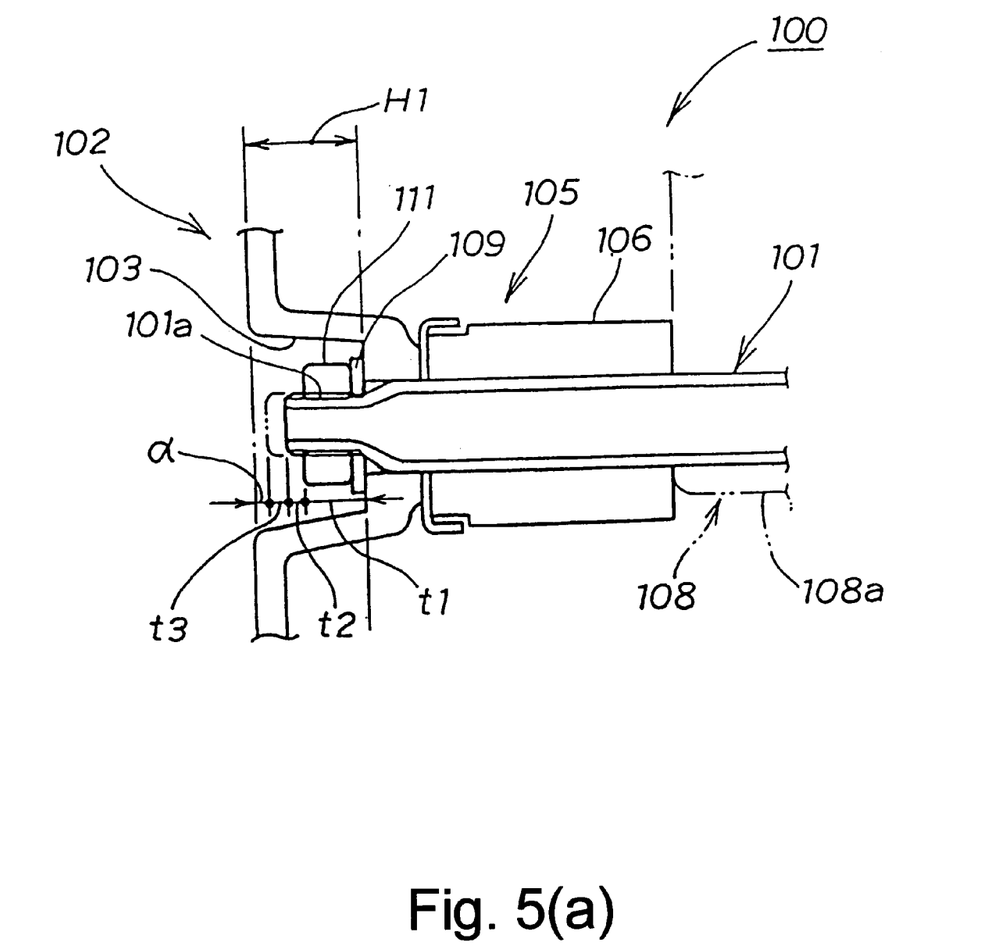
Figure 5B:
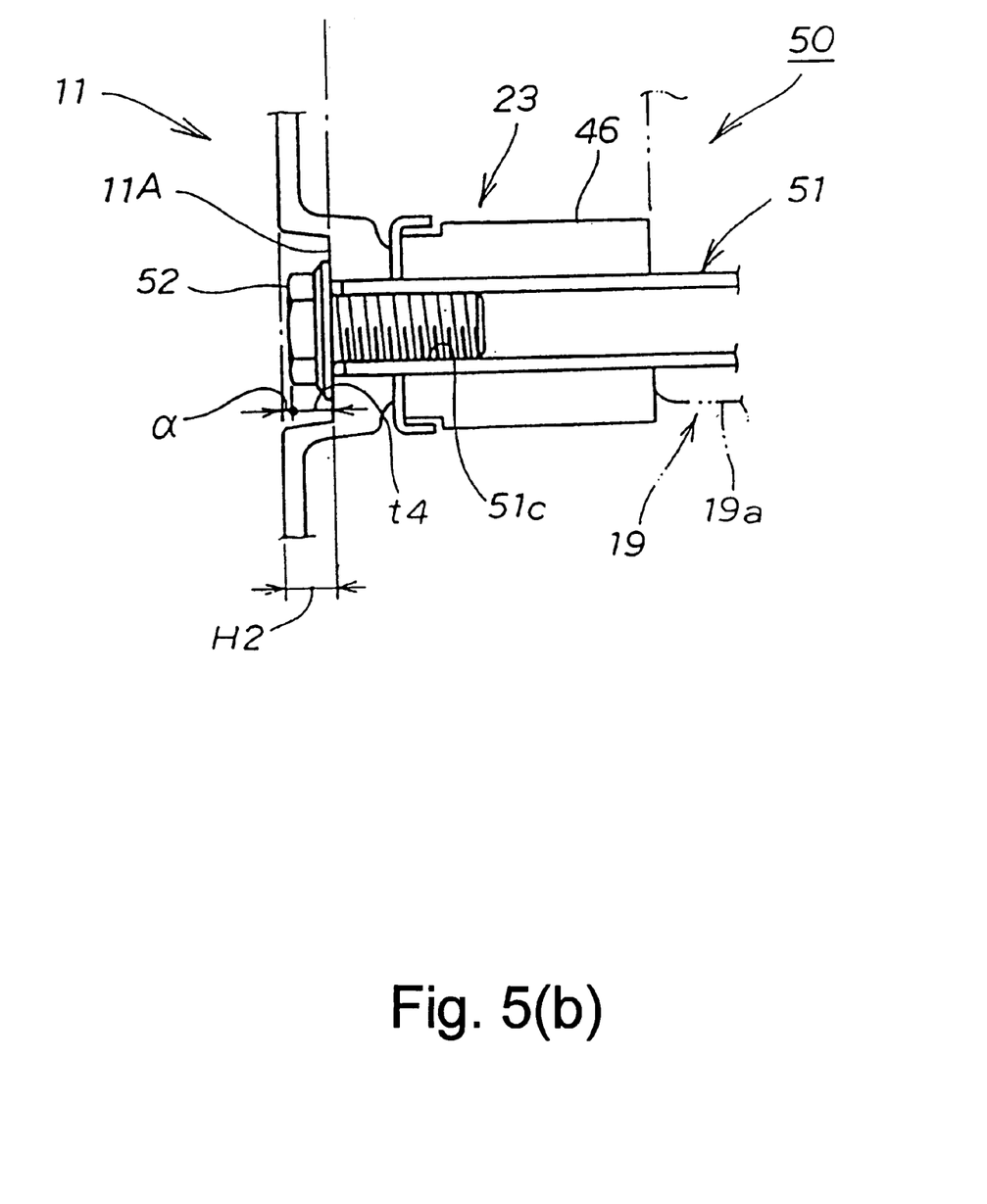

The operation of the above described swingarm support structure 50 will now be described. FIG. 5(a) and FIG. 5(b) are drawings for describing the operation of the swingarm support structure of the present invention. FIG. 5(a) shows a comparative example and FIG. 5(b) shows an embodiment of the present invention.

In FIG. 5(a), a swingarm support structure 100 is provided with a threaded section 101a in a tip end of a pivot shaft 101. Left and right engagement sections 106 and 107 (the right section 107 is not shown) of a swingarm 105 and a crankcase 108a of an engine 108 are interposed between left and right pivot support sections 103 and 104 (the right pivot support section 104 is not shown) of the vehicle frame 102. A pivot shaft 101 passes through the above components, and a nut 111 is screwed onto the threaded section 101a of the pivot shaft 101 via a washer 109 at the left pivot support section 103 side.

The depth of the left pivot support section 103 is H1, the overall thickness of the bolt and the washer is t1, and generally there is an incompletely threaded section in the threaded section 101a, which means that it is necessary for the threaded section 101a to protrude from the nut by at least 3 screw pitches. If the size of the incompletely threaded section is t2, the length by which the tip end of the pivot shaft 101 protrudes with variations in torque used to screw on the nut is t3, and the size of an estimated surplus is $\alpha$, H1 becomes the total of t1, t2, t3 and $\alpha$ (H1=t1+t2+t3+$\alpha$). As a result, the width of the vehicle is increased.

In FIG. 5(b), the tip end of the pivot shaft 51 is hollowed out and a threaded section 51a is formed inside. By screwing the bolt 52 into the threaded section, the pivot shaft 51 is attached to the left and right pivot support sections 11A and 11B (the right pivot support section 11B is not shown).

Accordingly, all that protrudes from the left pivot support section is the head section of the bolt 52. If the depth of the left pivot support section 51 is H1, the thickness of the head section of the bolt 52 is t4 and the anticipated size of a surplus is $\alpha$, then H2 becomes the sum of t4 and $\alpha$ (H2=t4+$\alpha$).

Generally, the thickness of the bolt head is thinner than a nut. Furthermore, since there is no washer, t4<t1, and t2 does not need to be taken into consideration. This means that it is possible for the depth H2 of the left pivot support section 11A to be made shallower than the depth of the left pivot support section shown in FIG. 5(a) (H2<H1). That is, the width direction of the vehicle can be made narrower.

Also, since the tip end of the pivot shaft 51 is hollowed out and a threaded section 51c is formed inside, there is no damage to the threaded section 51c into which the bolt 52 is screwed into when inserting the pivot shaft 51 into the left and right pivot support sections 11A and 11B.

In the present invention, as shown in FIG. 2, a pivot shaft 51 is inserted from a right pivot support section 11B side, and a bolt 52 is screwed into the pivot shaft 52 from the left pivot support section 11A side. However, the present invention is not limited to this orientation and it is possible to insert the pivot shaft 51 from the left pivot support section 11A side and to screw the bolt into the pivot shaft 51 from the right pivot support section 11B side.

The present invention achieves the following effects with the above described structure.

In the related art, a threaded section is formed at a tip end of a pivot shaft. Furthermore, when a nut is screwed onto the threaded section to fasten left and right pivot support sections together, the length to which the tip of the pivot shaft protrudes varies with the torque with which the nut is screwed on. However, in accordance with the present invention, hollowing out the tip end of the pivot shaft is hollowed out and a threaded section is formed inside, and the pivot shaft is attached to left and right pivot support sections by screwing a bolt into the threaded section.

Accordingly, all that protrudes from the left and right pivot support sections of the pivot shaft and the bolt section are the respective head sections, and it is possible to make the length of protrusion from the left and right pivot support sections constant. As a result, all that protrudes from the left pivot support section arranged on the bolt side or the right pivot support section is the bolt head, and it is possible to make the depth of the left pivot support section arranged on the bolt side or the depth of the right pivot support section shallower than in the related art.

Also, since a tip end of the pivot shaft is hollowed out and a threaded section is formed inside, there is no damage to the threaded section into which the bolt is screwed when inserting the pivot shaft into the left and right pivot support sections. Therefore, it is possible to improve the ease of assembly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swingarm support structure for a motorcycle, the motorcycle being provided with a seat between a front wheel and a rear wheel, left and right pivot support sections provided on opposite sides of a vehicle frame below the seat, and a swingarm for supporting the rear wheel swingably supported at the pivot sections via a pivot shaft, said swing arm support structure comprising:

a tip end of the pivot shaft is hollowed out;

a threaded section is formed inside the pivot shaft; and a bolt is screwed into the threaded section for attaching the pivot shaft to the left and right pivot support sections;

wherein said pivot shaft is rigidly attached to the left and right pivot support sections.

2. The swingarm support structure according to claim 1, wherein said pivot shaft includes an end opposite to said tip end, said end opposite to said tip end having an enlarged head section formed thereon, said enlarged head section for cooperating with one of the left and right pivot support sections, and said bolt for engaging with the other of the left and right pivot support sections.

3. The swingarm support structure according to claim 2, wherein said pivot shaft is insertable through said left and right pivot support sections, left and right engagement sections of said swingarm, and a crankcase of an engine of the motorcycle in order to support the swingarm on the motorcycle.

4. The swingarm support structure according to claim 3, wherein said left and right engagement sections are engaged in an engagement hole by bearings and a collar.

5. The swingarm support structure according to claim 4, wherein said left and right engagement sections are provided with a cupped dust seal on an outer side and a dust seal on an inner side.

6. The swingarm support structure according to claim 2, further comprising:

a gap adjusting screw adjustably attached to said one pivot support section;

a locknut for fixing a position of said gap adjusting screw with respect to said one pivot support section; and wherein said enlarged head section cooperates with said one pivot support section via said gap adjusting screw.

7. A swingarm support structure for a motorcycle, comprising:

left and right pivot support sections provided on opposite sides of a frame of the motorcycle;

a pivot shaft, said pivot shaft having a hollowed out tip end and a threaded section formed therein;

a swingarm for supporting a rear wheel of the motorcycle, said swingarm swingably supported at said left and right pivot support sections via said pivot shaft; and a bolt is screwed into the threaded section to attach the pivot shaft to the left and right pivot support sections;

wherein said pivot shaft is rigidly attached to the left and right pivot support sections.

8. The swingarm support structure according to claim 7, wherein said pivot shaft includes an end opposite to said tip end, said end opposite to said tip end having an enlarged head section formed thereon, said enlarged head section for cooperating with one of the left and right pivot support sections, and said bolt for engaging with the other of the left and right pivot support sections.

9. The swingarm support structure according to claim 8, wherein said pivot shaft is insertable through said left and right pivot support sections, left and right engagement sections of said swingarm, and a crankcase of an engine of the motorcycle in order to support the swingarm on the motorcycle.

10. The swingarm support structure according to claim 9, wherein said left and right engagement sections are engaged in an engagement hole by bearings and a collar.

11. The swingarm support structure according to claim 10, wherein said left and right engagement sections are provided with a cupped dust seal on an outer side and a dust seal on an inner side.

12. The swingarm support structure according to claim 8, further comprising:

a gap adjusting screw adjustably attached to said one pivot support section;

a locknut for fixing a position of said gap adjusting screw with respect to said one pivot support section; and wherein said enlarged head section cooperates with said one pivot support section via said gap adjusting screw.

13. A motorcycle having a swingarm support structure, comprising:

a frame;

a seat mounted on said frame between front and rear wheels;

left and right pivot support sections provided on opposite sides of said frame;

a pivot shaft, said pivot shaft having a hollowed out tip end and a threaded section formed therein;

a swingarm for supporting a rear wheel of the motorcycle, said swingarm swingably supported at said left and right pivot support sections via said pivot shaft; and a bolt is screwed into the threaded section to attach the pivot shaft to the left and right pivot support sections;

wherein said pivot shaft is rigidly attached to the left and right pivot support sections.

14. The motorcycle according to claim 13, wherein said pivot shaft includes an end opposite to said tip end, said end opposite to said tip end having an enlarged head section formed thereon, said enlarged head section for cooperating with one of the left and right pivot support sections, and said bolt for engaging with the other of the left and right pivot support sections.

15. The motorcycle according to claim 14, wherein said pivot shaft is inserted through said left and right pivot support sections, left and right engagement sections of said swingarm, and a crankcase of an engine of the motorcycle in order to support the swingarm on the motorcycle.

16. The swingarm support structure according to claim 15, wherein said left and right engagement sections are engaged in an engagement hole by bearings and a collar.

17. The swingarm support structure according to claim 16, wherein said left and right engagement sections are provided with a cupped dust seal on an outer side and a dust seal on an inner side.

18. The motorcycle according to claim 14, further comprising:

a gap adjusting screw adjustably attached to said one pivot support section;

a locknut for fixing a position of said gap adjusting screw with respect to said one pivot support section; and wherein said enlarged head section cooperates with said one pivot support section via said gap adjusting screw.

\* \* \* \* \*